Figure 1:
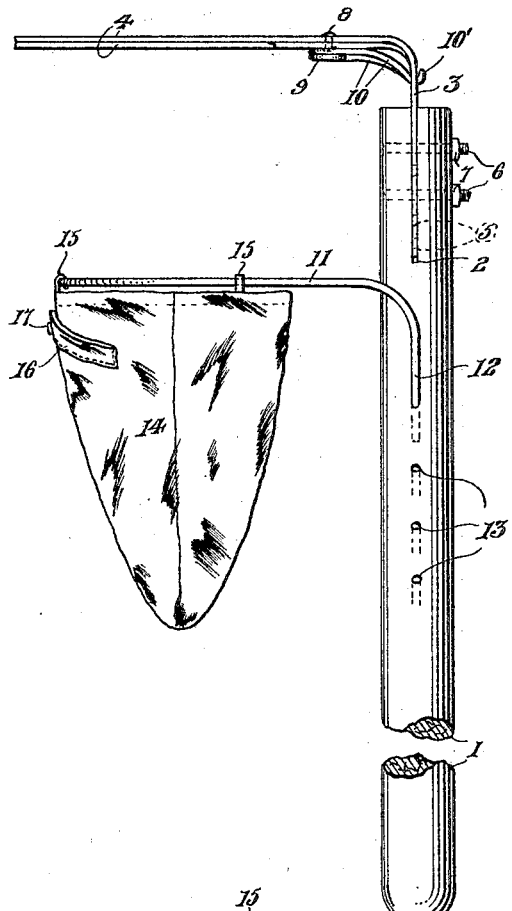

G. SROMOVSKY.
FRUIT GATHERER.
APPLICATION FILED JAN. 22, 1921.

1,397,464. Patented Nov. 15, 1921.

Inventor
G. Sromovsky

By F. K. L. Bryant,
Attorney

UNITED STATES PATENT OFFICE.

GEORGE SROMOVSKY, OF MANISTIQUE, MICHIGAN.

FRUIT-GATHERER.

1,397,464. Specification of Letters Patent. Patented Nov. 15, 1921.

Application filed January 22, 1921. Serial No. 439,222.

*To all whom it may concern:*

Be it known that I, GEORGE SROMOVSKY, a citizen of the United States of America, residing at Manistique, in the county of Schoolcraft and State of Michigan, have invented certain new and useful Improvements in Fruit-Gatherers, of which the following is a specification.

This invention relates to certain new and useful improvements in fruit gatherers and has for one of its objects to provide a gathering implement embodying a pair of rod or pole sections having coöperating cutting blades at the upper ends thereof with tensioned means associated with the blades for normally holding the same together.

A further object of the invention is to provide a fruit gatherer wherein a pair of cutting blades are supported upon the outer ends of elongated rods with a receiving basket or bag carried by the rods in line with the cutting blades to receive the fruit and prevent the same falling upon the ground.

With the above and other objects in view, the present invention consists in the novel form, combination and arrangement of parts hereinafter more fully described and shown in the accompanying drawings, in which like reference characters indicate similar parts throughout the several views.

Figure 2:
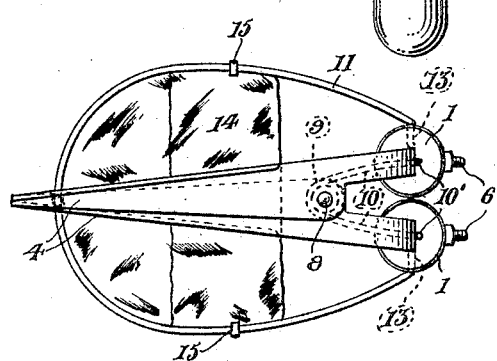
Figure 3:
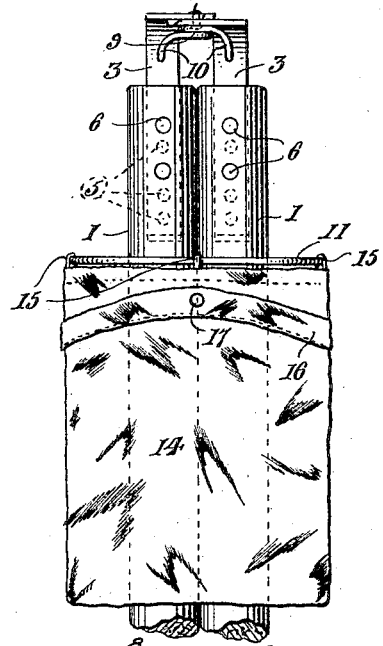
Figure 4:
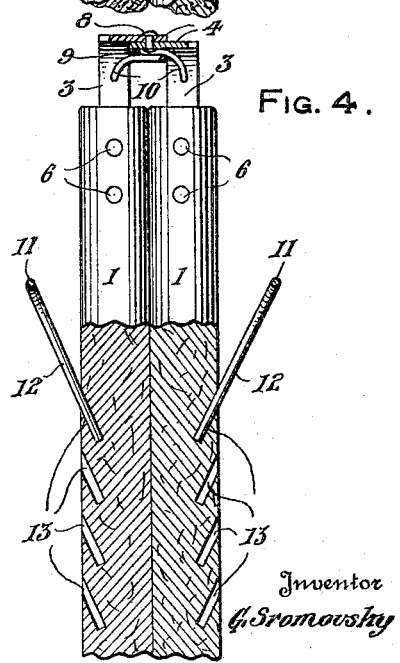

In the drawings,

Figure 1 is a side elevational view of a fruit gatherer constructed in accordance with the present invention, the handles being partially broken away, Fig. 2 is a top plan view of the same showing the cutting blades overlying the gathering receptacle, Fig. 3 is a front elevational view with the poles broken away and Fig. 4 is a detail fragmentary view, partially in section showing the adjustable mounting of the bag supporting frame on the poles.

Referring more in detail to the accompanying drawing, there is illustrated a fruit gatherer embodying a pair of relatively long pole sections 1 having a pair of cutting blades adjustably supported at the outer ends thereof. To provide the adjustable support, the outer ends of the poles are provided with end slots 2 within which the inner bent ends 3 of the cutting blades 4 extend. Each bent end 3 is received in a pole slot 2 and is provided with a series of openings 5 as shown in Figs. 1 and 3, through which the fastening bolts 6 extend with clamping nuts 7 received on the threaded ends thereof. The fastening bolts 6 extend through transverse openings in the outer ends of the poles 1 and the bent ends 3 of the blades are adjustable in the pole slots 2 to present the openings 5 for selective reception of the bolts. The blades 4 are pivotally connected together as at 8 and to maintain the blades in closed normal position as shown in Fig. 2, a wire spring embodying a coiled portion 9 has the ends 10 thereof extending through an opening in the bent ends 3 of the blades as indicated at 10' to place the blades under tension and normally hold the pole arms 1 in the position shown in Figs. 2 to 4.

A gathering basket is adjustably supported upon the poles 1 inwardly of the cutting blades 4 and in line therewith for reception of fruit cut from a tree, the gathering basket including a resilient wire frame 11 of the form best illustrated in Figs. 1, 2, and 4 with bent ends 12 selectively received in alined inclined sockets 13 provided in the outer sides of the pole arms 1 whereby the frame 11 may be positioned in various distances spaced from the cutting blades. A fabric bag 14 carries clips 15 at the open upper edge thereof for reception on the frame 11 as shown in Figs. 1 to 3 while the forward side of the bag is provided with an outlet door 16 closed by a snap fastener 17.

In the operation of the device, the poles 1 are suitably gripped at their inner ends and the blades 4 positioned for severing engagement with a fruit stem. By separating the arms 1 against the tension of the spring 10 and the resilient frame 11, the fruit stem is positioned between the blades 4 and upon release of pressure on the pole arms 1, the spring 10 and the resilient frame 11 effect the closing movement of the blades with the cut fruit falling into the bag 14. For various purposes, the bag supporting frame 11 may be selectively received in the inclined sockets 13 to vary the distance between the cutting blades and the bag. When the bag has been filled, the contents thereof may be removed from the side opening 16 and the device is again ready for immediate use. The connection of the cutting blades with the outer ends of the pole arms is also adjustable to meet various conditions in the pruning of fruit.

While there is herein shown and described the preferred embodiment of the invention, it is nevertheless to be understood that minor changes may be made therein without departing from the spirit and scope of the invention as claimed.

What is claimed as new is:—

1. A fruit gatherer comprising a pair of pole arms, a pair of pivoted cutting blades having the inner ends thereof adjustably secured in the outer ends of the arms and a gathering receptacle adjustably supported on said arms.

2. A fruit gatherer comprising a pair of pole arms, a pair of pivoted cutting blades having the inner ends thereof adjustably secured in the outer ends of the arms and a gathering receptacle adjustably supported on said arms, said gathering receptacle including a resilient wire frame having bent inner ends, there being alined socket openings in said poles with the inner bent ends of the frame selectively received therein.

3. A fruit gatherer comprising a pair of pole arms, a pair of pivoted cutting blades having the inner ends thereof adjustably secured in the outer ends of the arms, a gathering receptacle adjustably supported on said arms, said gathering receptacle including a resilient wire frame having bent inner ends, there being alined socket openings in said poles with the inner bent ends of the frame selectively received therein and clips carried by the upper edge of the receptacle for attachment to the frame.

4. A fruit gatherer comprising a pair of pole arms, a pair of pivoted cutting blades having the inner ends thereof adjustably secured in the outer ends of the arms, a gathering receptacle adjustably supported on said arms, said gathering receptacle including a resilient wire frame having bent inner ends, there being alined socket openings in said poles with the inner bent ends of the frame selectively received herein, clips carried by the upper edge of the receptacle for attachment to the frame, and said receptacle having a side opening therein.

5. A fruit gatherer comprising a pair of pole arms, a pair of pivoted cutting blades having the inner ends thereof adjustably secured in the outer ends of the arms, a gathering receptacle adjustably supported on said arms, and a spring embodying a coiled portion and end extensions connected to the cutting blades.

In testimony whereof I affix my signature in presence of two witnesses.

GEORGE SROMOVSKY.

Witnesses:
J. N. FORSHAR,
JOHN BARNES